June 18, 1935.  J. P. GATY  2,005,366
MACHINE GUN CAMERA
Filed May 26, 1933  5 Sheets-Sheet 4

INVENTOR
*John P. Gaty*
BY
*Hoquet & Meary*
ATTORNEYS

June 18, 1935.  J. P. GATY  2,005,366

MACHINE GUN CAMERA

Filed May 26, 1933   5 Sheets-Sheet 5

INVENTOR
John P. Gaty
BY
Hoguet & Neary
ATTORNEYS

Patented June 18, 1935

2,005,366

UNITED STATES PATENT OFFICE 2,005,366

MACHINE GUN CAMERA

John P. Gaty, Woodside, N. Y., assignor to Fairchild Aerial Camera Corporation, a corporation of New York Application May 26, 1933, Serial No. 672,946

9 Claims. (Cl. 88—16)

This invention relates in general to photographic cameras and more particularly to that type of camera known in the art as machine gun cameras, that is to say, cameras simulating the form of a machine gun and whereby the accuracy of the manipulation of the machine gun in target practice may be checked by inspection of the pictures taken.

An object of the invention is to provide such a device wherein a single lens may be utilized for the purpose of photographing both an object at a long distance and a watch at a short distance within the camera, so as to constitute a time record of the exposures taken.

Another object of the invention is to provide suitable filters whereby these two results may be obtained by the use of a single lens, and to provide means whereby the lens may be moved into alternate positions for accomplishing these two types of photographic exposure.

Another object of the invention is to provide an optical system, simple in nature and inexpensive as to cost, whereby fast lenses of high aperture ratio may be used, so as to increase shutter speeds far beyond those in conventional use, by means of the increase of light transmitting ability.

A still further object of the invention is to use and arrange such a filter, so that it will not act upon the rays of an illuminated watch, a picture of which is adapted to be recorded, but only the rays from the objects at a substantial distance. The purpose of this is to hold back the exposure of objects in the sunlight without making necessary excessive illumination on the watch, which may be photographed at the same lens opening or aperture and at the same shutter speed as the object in sunlight.

A still further object is to provide such a device as to consist of a self-contained moving picture camera unit, a watch unit which will be readily installed and removable from the device in their proper relation without necessity for adjustment. In this connection, an object of the invention is to provide a novel and efficient means of manual adjustment of the optical system, including light reflecting prisms and a movable lens.

A still further and important object of the invention is the provision and pre-arrangement of the operating parts of the device, whereby a definite sequence of operation is predetermined so as to allow for the taking of any desired number of pictures and an exposure on one of said pictures of a record of the time of day as well as the serial number of the series of pictures taken, this to be effected by the mere manual operation of a shutter tripping device.

With the foregoing and other objects in view, the invention consists in the combination of parts and in the details of construction hereinafter set forth in the following specification and appended claims, certain embodiments thereof being illustrated in the accompanying drawings, in which:

Referring more particularly to the drawings, the device consists of a main casing 1, in which the operative parts of the mechanism are enclosed, a pair of handles 2, by means of which the device may be pointed in the desired direction, a gun barrel 3, and a conventional ringsight consisting of the usual elements 4 and 5 to simulate the appearance of a machine gun as used particularly on aircraft.

The main casing is provided in its upper wall with a door 6, hinged at 7, through which a standard moving picture camera unit 8 may be inserted and which, when inserted, is self-aligned in its proper predetermined position, by means of longitudinally acting leaf spring 9, side springs 11 and guideways 10, and furthermore by means of a similar leaf spring 12 carried by the door 6, when the latter is closed after the insertion of the camera unit.

The casing is also provided with a slot and guide for the insertion of a watch unit, which comprises a slide 13, carrying a watch 14, a counter 15, and a setting device such as a knob 16 or a data card in place of the counter, and a slide 13' for carrying a series of lamp bulbs 17 with contact devices 18 and lead wires 19, this electrical unit being suitably connected to the wiring circuit of the device for predetermined illumination of the lamp bulbs when it is desired to take a photographic exposure of the watch and the counter.

Figures 10, 11, 12, 13, 13A, 14:
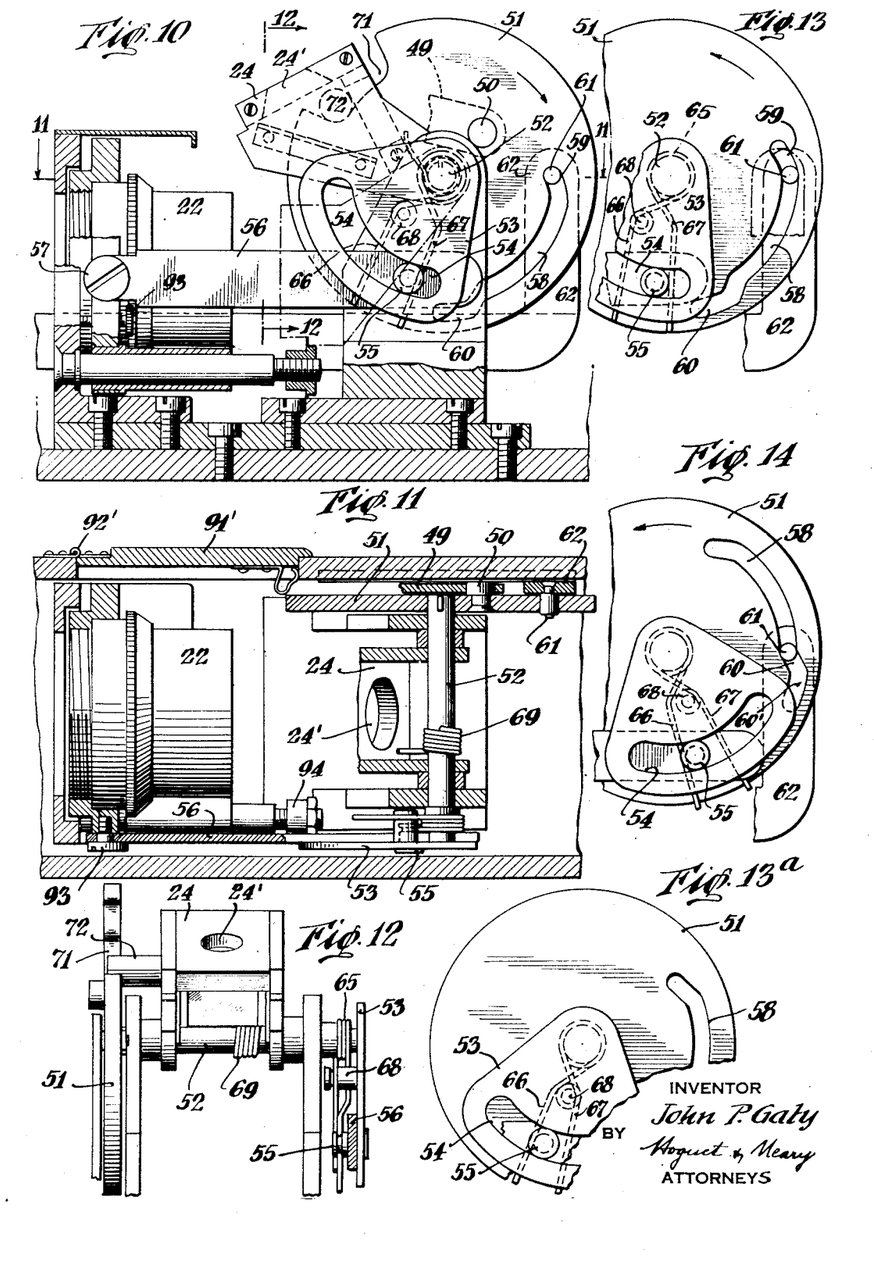
Figure 10 is an enlarged detailed view of a portion of the device shown in Figure 3 constituting the operating means for the movement of the lens and prism and showing the device in position for taking a series of pictures of long range objects.
Figure 11 is a view in section taken along line 11—11 of Figure 10.
Figure 12 is a view in section taken along line 12—12 of Figure 10.
Figure 13 is a fragmentary view of the cam operating device shown in Figure 10, showing the parts in the position they assume after a series of pictures of long range objects has been taken and the return movement of the actuating bar is taking place.
Figure 13a is a fragmentary view of the cam operating device shown in Figure 10 after a 30° counterclockwise rotation of the segment has taken place.
Figure 14 is a view similar to Figure 13 showing the parts in the position they assume when the operating link is near its rearward position, just prior to the taking of a single picture of the watch.
Figure 15:
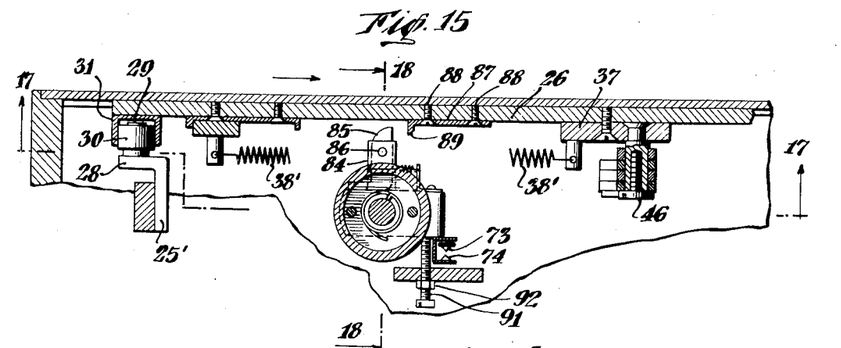
Figure 15 is a view in lateral section taken through a portion of the device along line 15—15 of Figure 17 showing the operating link and the circuit maker and breaker for the watch illuminating device and showing the circuit open.

The device further consists of a light aperture 20 and a filter device 21, constituting the only means for admission of outside light for the taking of pictures of objects external of the device, while the lamp bulbs constitute the means of illumination of the watch, for taking pictures of the latter. A single movable lens is employed for these two operations and is shown at 22. There is also provided in the optical system a stationary prism 23 and a movable prism 24, which latter is adapted to be moved in conjunction with the movable lens so as to be out of the path of the light rays utilized by the lens to photograph the external object and to be moved into said path and in proper position for permitting the taking of the picture of the watch which is on a higher plane than the cone of light passing through the lens from the external source. As shown in Figures 10, 11 and 12, this movable prism 24 has arranged in its face a diaphragm 24' near the lens, this diaphragm being of the form indicated in dotted lines in Figure 10.

Figures 22, 23:
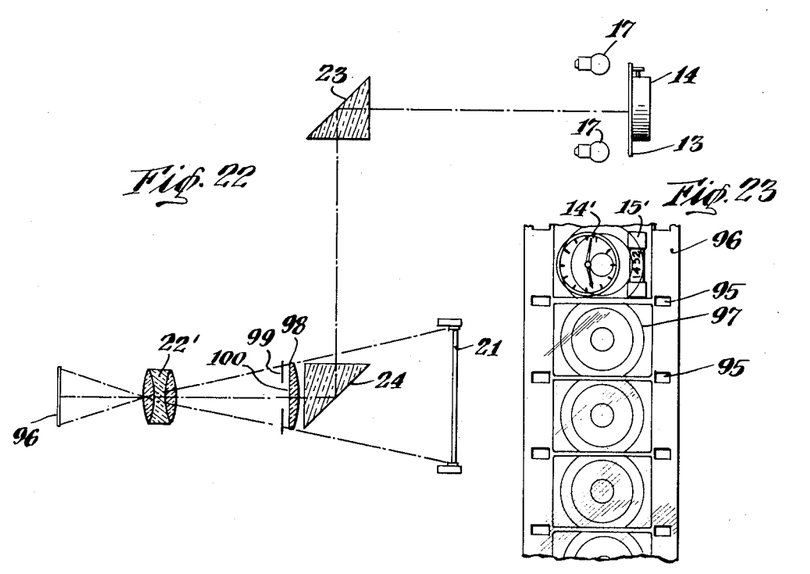
Figure 22 is a diagrammatic showing of a modified optical system for the device.
Figure 23 is an illustration of a partial strip of film showing the perforations, the reticles, and an exposure upon the last of the series of film frames of the time and serial number record.

In accomplishing these two operations, the mechanism involved briefly consists of a trigger 25 adjacent the spade grip handles, and a long operating bar 26, which, through other actuating elements, is adapted to elevate the prism and force the lens in a backward direction towards the handles when it is desired to take a picture of an external object upon the forward movement of the operating bar, and upon the return movement of the operating bar to cause the prism to be lowered and the lens moved forward and also cause the lamps to be illuminated, for the purpose of taking a photographic exposure of the watch. As shown in Figure 22, the movable lens 22 may be replaced by a stationary lens 22' and a correction lens 98 in the path of the light rays and a member 99 apertured at 100 disposed between the lens 22' and the correction lens 98 so as to take pictures of the watch and of long range objects without adjustment of the lens 22' or varying the speed or aperture of the shutter.

Figure 20:
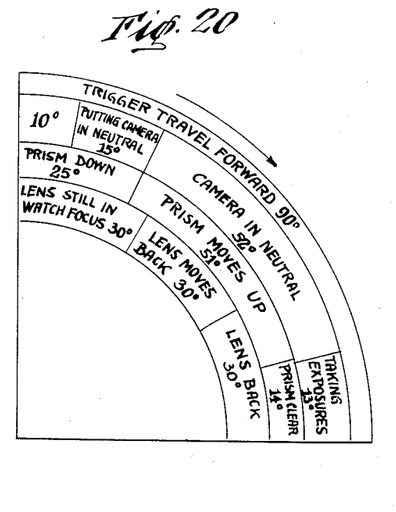
Figure 20 is a graphic representation of the sequence of operation of the various elements of the device during the forward travel of the main operating link.
Figure 21:
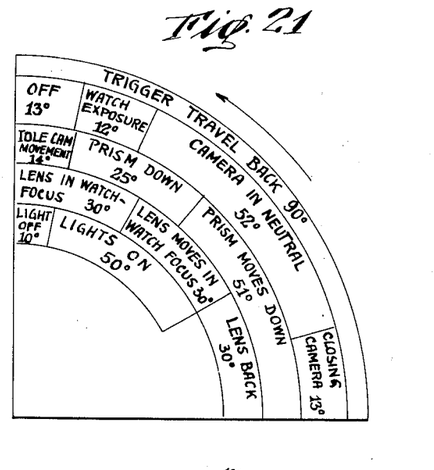
Figure 21 is a similar showing of the sequence of operation upon the return movement of the operating link.

Before going into a detailed discussion, Figures 20 and 21 graphically illustrate the sequence of operation of the operating elements throughout the entire cycle, as well as the photographic results obtained thereby.

Referring to Figure 20, the forward movement of the trigger and trigger operated bar is represented by an arc of 90°, the first 10° of which have no effect upon the camera, the next 15° of which effect the putting of the camera in neutral, the next 52° of which find the camera in neutral position throughout, and last 13° of which bring about the taking of photographic exposures of external objects. As to the movable prism, the first 25° of forward trigger movement does not effect the movable prism which is in downward position, the next 51° of forward movement is utilized in moving the prism upwardly, and the last 14° of forward movement finds the prism sufficiently elevated so as to be out of the path of light admitted through the filter 21, this taking effect just 1° prior to the time at which the taking of pictures of external objects is initiated.

With regard to the movable lens, it is still in focus for the watch for the first 30° movement and continues that way until after the prism is started to be moved upwardly. The lens starts to move in a rearward direction and continues its rearward movement for the next succeeding 30° forward movement of the trigger and the last 30° of such trigger movement finds the lens in its full rearward position during the time of taking of the photographic exposures of external objects and, indeed, for 17° prior to the beginning of such photographic exposure. Up to this time the desired series of pictures has been taken but no record of the time of day in which they were taken nor has the serial number of the series of pictures been recorded. These results are obtained during the backward travel of the trigger and trigger operated mechanism, which backward movement follows automatically upon the completion of the forward movement.

Referring to Figure 21, the first 13° of backward movement is utilized in closing the camera, the next 52° finds the camera in neutral position, during which period a switch is operated to illuminate the bulbs for the purpose of taking a picture of the watch and this illumination continues throughout the succeeding movement, while the last final position of the trigger finds the lamp bulbs non-illuminated.

The pictures of the external objects having been completed, it is no longer necessary to keep the movable prism out of the path of the light rays, and it is necessary to move it in proper position for the reflection of the watch image so as to take a picture thereof. Consequently the prism is moved downwardly and this is accomplished during the first 65° of movement, while the last 25° movement finds the prism in its furthest downward position, proper for the reflection above mentioned.

The lens having been in focus for taking pictures of external objects, it is necessary to refocus it for the taking of the internally arranged watch and consequently the lens having been in a rearward adjusted position remains so for the first 30° movement. The next 30° movement is utilized in moving the lens forward so as to put it into proper focus for the watch, while the last 30° movement finds the lens in such proper position. The switch for operating the watch illuminating lamp bulbs is operated by the return movement of the trigger bar after it has gone through 30° of its operation and acts to illuminate the watch prior to the time that the lens is in proper focus and prior to tripping the shutter for taking a photographic exposure of the watch. The lamps remain illuminated during the exposure and continue on for a fraction of a second after the photographic exposure of the watch has been taken, and the lights are turned off and remain off for the last 10° backward movement of the trigger, when the trigger is moved slowly.

The mechanism whereby the above described operations are accomplished will now be described, in detail: When the operator desires to take a series of pictures of external objects, all that is required to do is to press downwardly upon the lever 25, which is pivotally connected to the casing by means of a shaft 27. The trigger lever is provided with an integral downward extension 25', which is secured to a bracket 28 having an extension 29, about which is arranged a roller 30 mounted in a channel 31 carried by the bar 26. The flat operating bar 26 carries a plate 32 adapted to slide under a bracket 34 secured at 35 to the casing, said plate being formed with lugs 33 and 36 which by their abutment against either side of the bracket act respectively as limiting stops for the forward and rearward movement of the bar 26.

Figure 17:
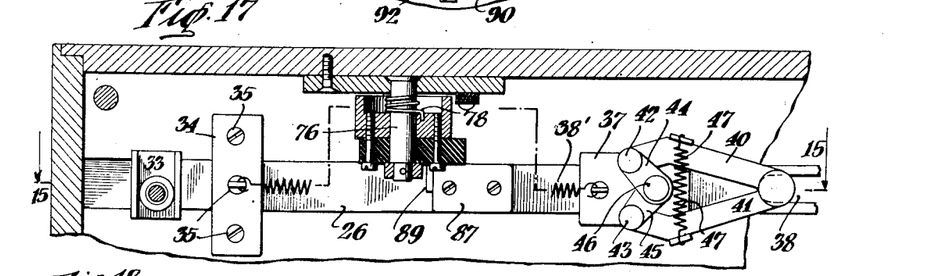
Figure 17 is a view in section taken along line 17—17 of Figure 15.
Figures 18, 19:
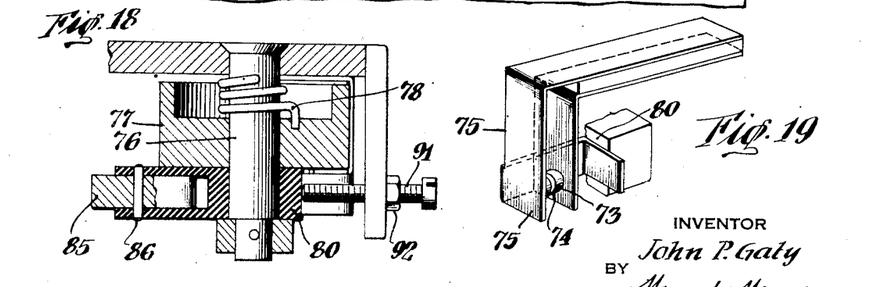
Figure 18 is a view in section taken along line 18—18 of Figure 15.
Figure 19 is a detailed view in perspective of the spring actuated circuit closure shown in Figures 15 to 18 inclusive.

In order to provide for a balanced movement of the operating bar 26 there is provided a block 37 secured to the bar 26, which latter is provided with an elongated slot 38. This block 37 has attached thereto a tension spring 38', the other end of which is secured to the stationary bracket 34. Fitting within the slot 38 and secured to the casing is a pin 39, which forms a common pivot for a pair of angularly disposed links 40 and 41 which, in turn, are pivotally connected, at 42 and 43, to a pair of relatively short links 44 and 45, which latter are connected to the block 37 on the common pivot 46. The effect of this construction may be seen by reference to Figure 3, which shows the trigger in normal upward position and the operating bar 26 in its full rear position. As the bar 26 is moved forwardly, the pin 39 remaining stationary, and the pivot point 46, being moved forwardly with respect thereto, tends to spread the pivot points 42 and 43 away from each other against the action of a spring 47, tending to keep the linkage assembly in the position shown in Figure 3. However, as the pivot point 46 is moved past the center, with respect to the pivots 42 and 43, the spring 47, in acting to compress the linkage and pull the links 40 and 41 towards each other, acts to aid the forward motion of the bar 26, until the linkage assembly assumes the position shown in Figure 17. It follows that the spring 47 performs a corresponding function in resisting a rearward movement until after the pivot point 46, as shown in Figure 17, reaches a point to the left of a dead center between pivot points 42 and 43, after which the spring, in acting to compress the toggle, assists in forcing the operating bar 26 rearwardly. This mechanism acts to balance the force exerted by spring 65 at all positions of travel of the bar 26.

Figure 1:
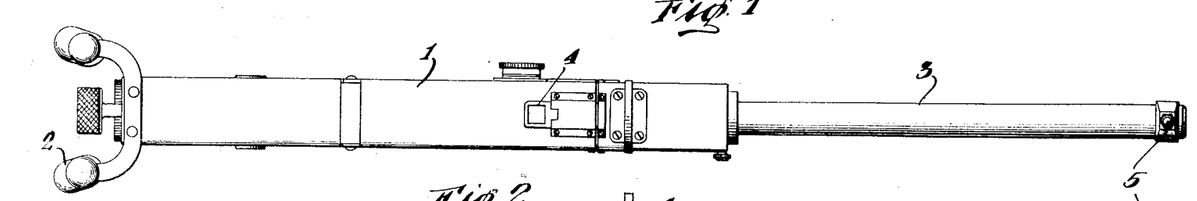
Figure 1 is a top plan view of the device.
Figures 2, 6, 7, 8, 9:
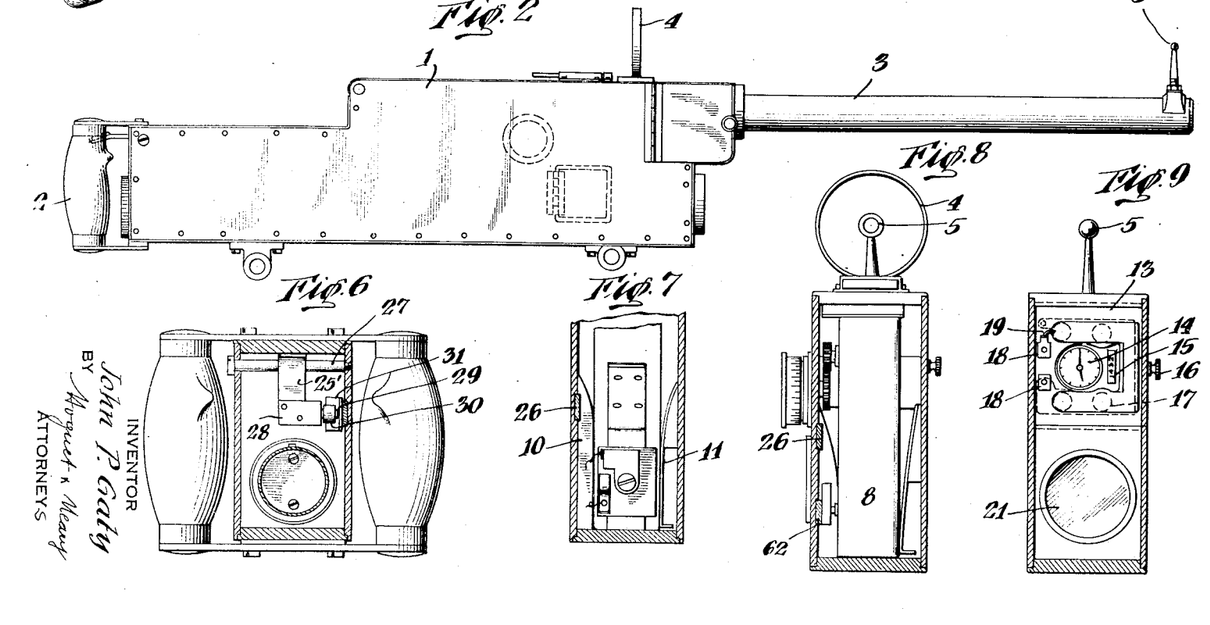
Figure 2 is a side elevation of the device.
Figure 6 is a view in front end elevation of the handle end of the device.
Figure 7 is a view in section taken along line 7—7 of Figure 3.
Figure 8 is a view in section taken along line 8—8 of Figure 3.
Figure 9 is a view in section taken along line 9—9 of Figure 3.
Figure 3:
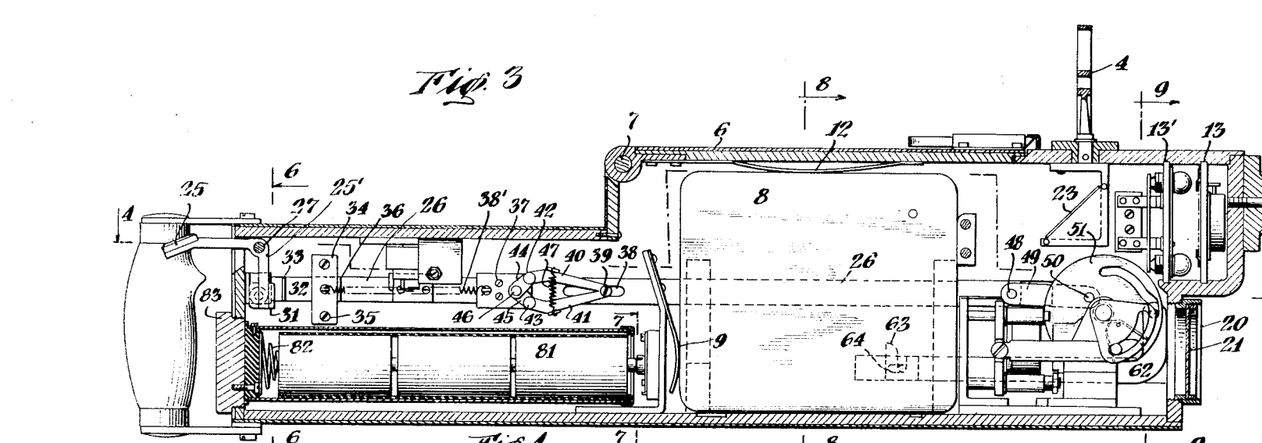
Figure 3 is a view similar to Figure 2 with one of the side walls of the casing removed.
Figure 4:
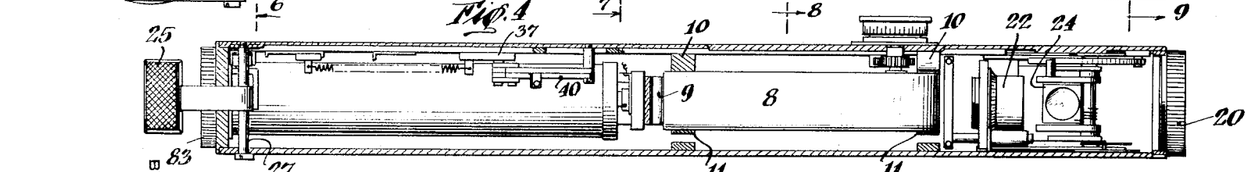
Figure 4 is a view in longitudinal section taken along line 4—4 of Figure 3.
Figure 5:
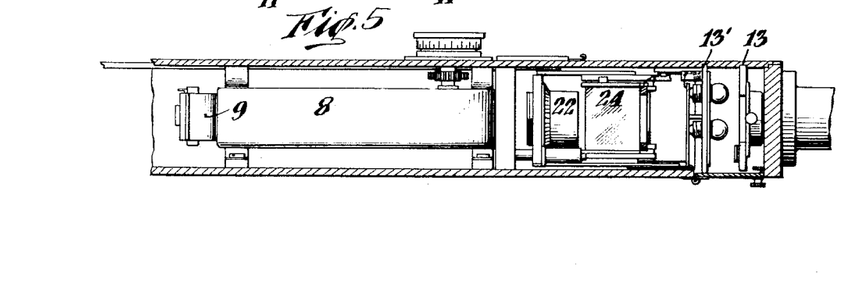
Figure 5 is a fragmentary view in top plan of the device with the upper cover of the casing removed.

Referring to Figures 3 and 10, the operating bar 26 extends forwardly and is adapted for reciprocatory motion, and at its forward end is pivotally attached, at 48, to a link 49, which latter is excentrically pivotally connected at 50 to a disc 51, concentrically mounted on a shaft 52, so as to be rotatable therewith. Keyed also to the shaft 52 is a segment 53 provided with an arcuate slot 54, in which is adapted to ride a lug 55, mounted on a short link 56, which latter is connected at 57 to the movable lens 22, in such a manner that a rotation of the segment causes the lens to be carried forward or moved back, corresponding to the direction of rotation of the segment. The operation of the trigger and the consequent operation of the operating bar 26 in rotating the disc 51 transmits this rotary movement to the segment through the medium of the common shaft 52. The disc 51 is also provided with an arcuate slot 58 with excentric extensions 59 and 60 to receive a pin 61.

Pin 61 is fixed to and carried by an angular flat bar 62, which extends rearwardly and is adapted for longitudinal sliding movement and is provided at its rear end with an operating hook 63, adapted to engage a suitable element 64, for setting in motion by any suitable means a standard moving picture camera unit. In other words, as explained in connection with Figures 20 and 21, the forward and rearward movement of the main operating bar 26 brings about the present described motion of the link 62, in such a manner that at a certain predetermined operation of the forward movement of the operating bar 26 acts through the medium of the link 62 to set the camera mechanism into operation so as to take a number of pictures of an exterior object.

A reverse movement of the link 62 is effected so as to again set the camera mechanism into operation, so as to take a single picture of the interior located watch; this latter function also taking place at a predetermined point in the return movement of the main operating bar. In order to bring this result about it must be remembered that the forward movement of the main actuating bar 26 causes a rotation of the cam disc 51 in a clockwise direction, and that during this movement the pin 61 rides in the groove 58, and so long as the pin remains in the concentric portion of the groove, no movement is imparted to the camera operating link 62.

Figure 13 shows the pin 61 in the upper extremity of the concentric portion of the groove 58 just below the excentric portion 59, this position being assumed just after the actuation of the camera for a series of exposures of the exteriorly located object, as the cam disc 51 is being rotated counterclockwise by the return movement of the bar 26 and the pin 61 has been forced out of the upper excentric groove 59 into the concentric portion 58. Figure 14 shows the position of the pin 61 after the disc 51 has been rotated further in a counterclockwise direction by a rearward movement of the operating bar 26. Pin 61 is here shown just above the lower excentric portion 60, the lamp bulbs having been illuminated and the camera being set in position for taking a single picture of the watch, which occurs as the pin 61 is forced to ride in the excentric portion 60, as this imparts a movement of the camera operating link 62 forwardly to bring this about. The pin 61 then rides in the groove extension 60' which is concentric and allows a movement of the light switch to extinguish the lamp bulbs.

As above mentioned, the forward movement of the operating bar 26 also causes a back and forth sliding movement of the movable lens 22, this being brought about by the riding of a pin 55 mounted on a link 56 in the groove 54 of the segment 53. The actual means for imparting this back and forth sliding movement, however, comprises a spring 65 which is coiled about the shaft 52, upon which the segment 53 is fixedly mounted. This spring further comprises two depending leaves 66 and 67, which are spaced apart and adapted to straddle the pin 55 and a pin 68, which is carried by the segment. As the segment is rotated by the rotation of the shaft 52 in a counterclockwise direction, the spring leaves 66 and 67 change from their relative positions shown in Figure 10 with respect to pins 55 and 68 until they first assume the position shown in Figure 13a, the pin 68 and spring 66 being carried forward to the right until spring 66 engages pin 55 carried by link 56 after 30° of rotation of segment 53. The pin 68 in its further movement leaves spring 66 and engages spring 67 as shown in Figure 14. The effect of this is to provide a positive and resilient shifting means for the lens as well as for a delayed shift for a certain period in the cycle of operation of the assembly. In other words, during the forward or clockwise movement the segment pin 68 by forcing the spring 66 has caused spring 67 to pull pin 55 along. During the rearward or counterclockwise movement, no shifting of the lens forward is accomplished until after spring 66 has engaged pin 55, as shown in Figure 13a, and also after pin 68 has left spring 66 and engaged spring 67 which effects such shift.

As explained before, this movable lens is found in its full forward position when it is timed for the exposure of the watch and in its full rearward position when it is timed for the exposure of externally located objects. In this connection it is also necessary to synchronize with the movement of the lens and the operation of the camera mechanism, the movement of the movable prism so that it will be in proper position for taking pictures of exteriorly located objects and of the internally located watch in a predetermined sequence. To bring this about the movable prism is also mounted so as to be rotatable with shaft 52 and is provided with a coil spring 69 wound around the shaft and bearing against the prism. This tends to force the prism to a downward position which occurs, and is brought about through mechanism about to be described, when it is desired to take a single exposure of the watch.

To bring about the rotation of the prism, the disc 51 is also provided with a peripheral recess 71, in which it is adapted to ride a pin 72 fixedly secured to the movable prism. It will also be seen by reference to Figure 10 that as the disc 51 is rotated in a clockwise direction, by means of a forward movement of the actuating bar 26, the pin 72 will abut against the left extremity of the recess 71, in such a manner that the prism will be also rotated in a clockwise direction. This has the effect of raising the prism from its lower position to a higher position so that it will be out of the path of the light rays, so as to make it possible to take long range pictures. Upon the return movement of the actuating bar 26, the spring 69 acts to return the prism to its lower position, this action of the spring being controlled by the limits of the recess 71, and the engagement therewith of the pin 72. As explained in connection with Figure 21, this movement of the prism takes effect throughout the first 65° of movement and the remaining 25° of movement of the trigger bar has no effect towards moving the prism, as it is already in its full downward position. The recess 71 is therefore of substantial elongated form so as to allow for a certain movement of the disc 51, necessary for the actuation of other elements of the device without moving the prism.

Referring now more particularly to Figures 3, and 15 to 19 inclusive which illustrate in detail a switch mechanism for illuminating the bulbs for the watch, it must be recalled in connection with Figure 21 that this illumination of the watch occurs near the end of the return travel of the trigger bar 26. The switch may consist of a pair of opposed contacts 73 and 74, the former being carried by the casing so as to be stationary, and the latter carried by a spring element 75 tending to urge the contact 74 into engagement with the contact 73.

Also carried by the casing and loosely mounted on a shaft 76 is a rotatable element 77 normally urged in a clockwise direction by means of a spring 78 keyed to the shaft 76 at 79. This rotatable element is also provided with an abutment portion 80 which is adapted to contact with the upper portion 75' of the spring 75, and by reference to Figure 15, it will be seen that a downward pressure on the spring 75 causes the contacts 73 and 74 to be disengaged and consequently the lamp lighting circuit (not shown) of which they form a part, keeping the circuit open. In this connection it might be stated that the preferable source of electrical energy for lighting lamps is a series of batteries 81, spring pressed by a spring 82 within the casing which may be inserted therein and kept there by a suitable screw knob 83, as shown in Figure 3.

Referring now again to Figures 15 and 16, the element 77 also comprises an extension 84 in the form of a slide to receive an element 85, pivoted at 86, which may also be in the form of a spring plunger, if desired.

Figure 16:
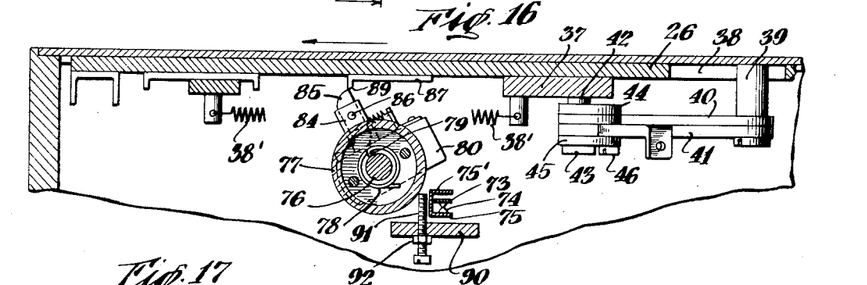
Figure 16 is a view similar to Figure 15 showing the circuit closed.

The actuating bar 26 carries an operating bracket 87 by means of the screws 88, the bracket being formed with outwardly depending bevelled edge 89, which is adapted for engagement with the member 85. It will be seen that a movement of the bracket 87, from the position to the left of the element 85 to the relative position shown in Figure 15, would cause no actuation or rotation of the assembly 77, inasmuch as the bevelled edge 89 would merely ride over element 85. Upon a return movement, however, of the actuating bar 26, the straight edge of the downward portion of the bracket 87 engages with the said edge of the member 85, as shown in Figure 16, so as to release the spring 75' from the downward pressure of the block 80 under the force of the spring 78, so as to allow the spring 75 to urge the movable contact 74 into engagement with the stationary contact 73 for the purpose of closing the circuit for illuminating the bulbs. As explained in connection with Figure 21, this occurs after the expiration of 30° of the return travel of the trigger lever and continues for 50° until after which the lamp circuit is again open for the remaining 13°. In order to bring this result about it will be seen by reference to Figure 16 that a further return movement of the bracket 87 to the left will result in the element 85 being freed from engagement with the bracket 87, after which time the spring 78 again rotates the assembly 77 clockwise, this resulting in the block 80 forcing the contact 74 out of engagement with stationary contact 73 against the action of spring 75. For purpose of adjustment of the movable block 80, with respect to the spring actuated contacts, there may be secured to the casing a stationary block 90, with an adjustment screw 91, and nut 92, to limit the degree of clockwise rotation of the block 80. It will be appreciated that without the inertia effect of such an arrangement provided by the assembly 77, a sudden and a gradual return of the trigger bar 26 would cause different time intervals of the illumination of the lamps with an ordinary switch arrangement. For the purpose of insuring an ample duration of illumination therefore the assembly 77 is employed and the arrangement described makes for a slow and gradual movement thereof so as to provide for a definite time interval from the instant that bracket 89 rides over and releases member 85 until block 80 returns and forces contact 74 out of engagement with contact 73 to open the circuit and extinguish the lamps. This action is uniform even when the trigger is released suddenly.

Thus it will be seen that there has been provided a device in which all of the apparatus for effecting a change of focus of the lens and alteration of the light path is placed back of the filter, which latter also serves the additional useful purpose of screening the mechanism from dust and moisture.

It will also be seen that there has been provided a novel and efficient method of regulating the amount of light passed from the watch to the lamps without any necessity for adjustment of the watch, or an adjustment of the illumination thereof. Referring, however, to Figures 10 and 11, there is provided a means for adjustment of the movable lens and in this connection the casing is provided with a door 91' integrally connected at 92' and a suitable set of adjustment means 93 and 94, whereby the limits of motion of the lens may be effected. In actual practice it has been found, that in the lens as at present used, the light transmitting ability may be varied through the ratio of 64-1. The restriction is placed on the amount of light transmitted from the watch face to the lens by means of a suitable diaphragm stop which may be placed in front of the lens at all times when the watch is being photographed. Such a diaphragm stop tends to render ineffectual all lens apertures greater than the previously determined optimum value so as to prevent the watch image from being over exposed on the film when the lens is used at large apertures. This would make it unnecessary to make any adjustment of the illumination on the face of the watch, even though the lens be used through its entire range of diaphragm openings to compensate for changing exterior light conditions. Theoretically some distortion of the image would be introduced by placing a diaphragm stop outside the lens, but if such effect is present, it cannot be detected in the photographs made of the watch.

Figure 23 represents a strip of 16 mm. film, having 1 pair of perforations 95 for each frame. The upper frame 96 is shown as having thereon a picture 14' of the watch and a picture 15' of the serial number indicator. The reticles above referred to are shown at 97 and on each of the frames including that one upon which the pictures of the watch serial number indicator are shown.

The entire device having been properly adjusted, it is only necessary to press downwardly upon the manual trigger element 25 to initiate a complete cycle of operation of the device that results in the taking of a series of pictures of long range objects, and the last frame of each of said series having recorded thereon a picture of the clock and the serial number of the series. The sequence of operation of the various parts of the device and the results obtained are best understood while referring to the various figures showing the operating mechanism, and to the showing of the sequence of operation in Figures 20 and 21.

In summary, the forward movement of the trigger bar, initiated by the downward pressure of the trigger element 25, shifts the movable prism upwardly out of the path of the light rays and starts the camera mechanism which takes a series of pictures of external objects at long range. The return movement of the main trigger actuating bar follows automatically upon the release of pressure from the trigger and effects the movement of the prism into a downward position so as to be in the path of the light rays; moves the lens to a forward position; closes the light circuit for illuminating the watch face; operates the camera unit to take a single exposure of the watch face when illuminated; and lastly opens the lamp lighting circuit so as to constitute a complete cycle of operation. The whole operating system then lies idle until another actuation of the operating lever, at which time a similar cycle of operation is initiated and automatically completed. As an alternative arrangement, that optical system shown in Figure 22 may be employed using a correction lens in connection with the main lens instead of making the latter shiftable, thus reducing the number of working parts considerably. The sequence of operation and desired results otherwise remain the same as hereinabove explained in detail.

I claim:

1. In a camera comprising a casing, a single photographic objective in said casing and means aligned therewith for admitting light from an external source into said casing, means supporting said objective for movement into a predetermined focal relationship with said light admitting means for the purpose of photographic exposure of objects located externally to said casing, an object located interiorly of said casing and means for illuminating the same, a light reflecting system including a reflecting member and means supporting the same for movement into such relationship with respect to the axis of said objective as to provide a secondary light path between said object and said objective, said objective supporting means also supporting the objective for movement into a predetermined focal relationship with said reflecting member for the purpose of photographing said internally located object.

2. In a camera comprising a casing, a single photographic objective in said casing and means aligned therewith for admitting light from an external source into said casing, means supporting said objective for movement into a predetermined focal relationship with said light admitting means for the purpose of photographic exposure of objects located externally to said casing, an object located interiorly of said casing and means for illuminating the same, a light reflecting system including a reflecting member and means supporting the same for movement into and out of such relationship with respect to the axis of said objective as to provide a secondary light path between said object and said objective, said objective supporting means also supporting the objective for movement into a predetermined focal relationship with said reflecting member for the purpose of photographing said internally located object and control means for moving said objective and movable reflecting member in a predetermined sequence.

3. In a camera, a casing, an optical system in said casing including a single movable objective, a stationary reflecting prism and a movable reflecting prism, an object within said casing, means for preparing said optical system for photographic exposure of said internal object and also for photographic exposure of externally located objects, said means including means for moving said movable prism into the axis of said objective to provide a light path between said object and said objective through the medium of said stationary prism and said intervening movable prism and for simultaneously moving said objective in a different direction into a predetermined focus position, and means for creating artificial illumination for said internally located object at a predetermined time with respect to the completion of such movement, said moving means also being adapted to move said movable prism out of the axis of said objective and to simultaneously move said objective into another predetermined focus position.

4. In a camera comprising a casing, a single movable photographic objective in said casing, means aligned with said objective for admitting light into the casing from an external source, a stationary reflecting prism and a movable reflecting prism within said casing, means for shifting simultaneously said movable prism and said objective so as to bring said objective to one focus position and said movable prism out of the axis of said objective for taking photographic exposures of external objects and for shifting said objective to another focus position and said movable prism into the axis of said objective and into operative relationship with said stationary prism to form with said stationary prism a light path between said objective and an object located within said casing and means for creating artificial light within said casing to follow said light path for photographing objects within said casing.

5. In a camera comprising a casing, a single photographic objective in said casing, means aligned with said objective and including a filter for admitting light into said casing from an external source, an instrument within the casing, a stationary reflecting prism and a movable reflecting prism within said casing, means for moving said movable prism into the axis of said objective, to form with said stationary prism a light path between the instrument and objective, and for simultaneously moving said objective in a different direction into a predetermined focus position, and means for creating artificial illumination within said casing at a predetermined time with respect to the completion of such movement, said moving means also being adapted to move said movable prism out of the axis of said objective and to simultaneously move said objective into another predetermined focus position.

6. In a camera comprising a casing, a single photographic objective in said casing, means aligned with said objective and including a filter for admitting light into said casing from an external source, an optical system in said casing including a stationary reflecting prism and a movable reflecting prism, an object within said casing to be photographed, means for preparing said optical system for photographic exposure of said internal object or for photographic exposure of externally located objects, said means including means for moving said movable prism into the axis of said objective, to provide a light path between said object and objective through the medium of said prisms, and for simultaneously moving said objective in a different direction into a predetermined focus position, and means for creating artificial illumination for said internally located object at a predetermined time with respect to the completion of such movement, said moving means also being adapted to move said movable prism out of the axis of said objective and to simultaneously move said objective into another predetermined focus position.

7. In a camera comprising a casing, a single photographic objective in said casing, means aligned with said objective for admitting light into said casing from an external source, an instrument located within the casing, an optical system in said casing including a stationary reflecting prism and a movable reflecting prism, means supporting said objective for movement into a short focus position and means supporting said movable prism for movement simultaneously into the axis of said objective in position for photographic exposure of said instrument by forming with said stationary prism a light path between said instrument and objective, and means for creating artificial light within the casing for following said path, said means supporting said objective also supporting the same for movement into a long focus position and said means supporting said movable prism also supporting the same for simultaneous movement out of the axis of said objective in position for photographic exposure of exteriorly located objects.

8. In a camera comprising a casing, an instrument located within the casing, an optical system in said casing including a stationary reflecting prism, a movable reflecting prism and a single photographic objective, means aligned with said objective for admitting light into said casing from an external source, means supporting said objective for movement into a short focus position and means supporting said movable prism for movement simultaneously into the axis of said objective in position for photographic exposure of said instrument by forming with said stationary prism a light path between said instrument and objective, and means for creating artificial light within the casing for following said path, said means supporting said objective also supporting the same for movement into a long focus position and said means supporting said movable prism also supporting the same for simultaneous movement out of the axis of said objective in position for photographic exposure of objects external to said casing, a manually operable trigger bar and a rotary element actuated thereby, means rotatable with said element for resiliently shifting said movable objective, means also rotatable with said element for shifting said movable prism, said element being provided with a concentric groove with excentric extensions near either end, and a camera operating member operatively associated with said groove and during the rotation of said element adapted to be so actuated as to cause an operation of said camera as the eccentric portions are alternately engaged.

9. In a camera comprising a casing, an optical system in said casing including a stationary reflecting prism, a movable reflecting prism and a single movable photographic objective, means aligned with said objective for admitting light into said casing from an external source, an instrument located within the casing, means including a manually controlled operating bar for shifting said objective to a long focus position and simultaneously shifting said movable prism out of the axis of the objective during the forward movement of said bar, and for initiating the operation of said camera substantially at the end of the forward movement of said operating bar, and for stopping the operation of said camera during the return movement of said operating bar until the latter portion of such return movement and for shifting said movable objective into a short focus position and for simultaneously shifting said movable prism into the axis of said objective during the return movement of said bar to form with said stationary prism a light path between the instrument and objective and means for creating artificial light within the casing predeterminedly with respect to the time said path is created for the purpose of a single photographic exposure of said instrument.

JOHN P. GATY.